Patented June 26, 1923.

1,459,852

UNITED STATES PATENT OFFICE.

MARTIN MUGDAN AND WILLY HERRMANN, OF NUREMBERG, GERMANY, ASSIGNORS TO CONSORTIUM FÜR ELEKTROCHEMISCHE INDUSTRIE G. M. B. H., OF NUREMBERG, GERMANY.

MANUFACTURE OF ETHYL ACETATE.

No Drawing. Application filed November 26, 1913. Serial No. 803,279.

*To all whom it may concern:*

Be it known that we, MARTIN MUGDAN and WILLY HERRMANN, subjects of the German Emperor, residing at Nuremberg, in the Empire of Germany, have invented certain new and useful Improvements in the Manufacture of Ethyl Acetate, of which the following is a specification.

It is known that the transformation of aliphatic aldehydes into the corresponding fatty acid esters, e. g. of acetaldehyde into ethyl acetate, can be effected by the action of aluminium alcoholate. This polymerization of aldehyde has been recently closely investigated by Tischtschenko (Journ. Russ. Phys. Chem. Ges. 388, p. 398-418; Chem. Centralblatt 1906 11. p. 1309), who employed a pure distilled aluminium alcoholate. When employing acetaldehyde he obtained yields up to about 70% of ethyl acetate but in order to obtain this yield he had to employ considerable quantities of the catalyst, namely 15% and moreover the reaction required at least several days but usually weeks or months.

Now we have discovered the surprising fact that it is possible to obtain an almost quantitative yield of ethyl acetate with very considerably smaller quantities of catalyst and that moreover the very long reaction-time can be very considerably shortened if aluminium alcoholate is employed as condensing agent in conjunction with a substance containing a halogen. These substances must obviously be employed only in such amounts that their own characteristic polymerizing action does not take place or only takes place to a very small extent.

We prefer employing the halogenides or other halogeniferous compounds of metals such as tin, aluminium, silicon, etc. These additions may be conveniently melted with the aluminium alcoholate but they may also be incorporated in any other suitable manner. For instance iodine in the elementary form can be added previously in preparing alcoholate by the method of Gladstone and Tribe (Jahresber, Über die Fortschr. d. Chemie 1876, p. 329) and the crude alcoholate containing iodine may be employed forthwith without further rectification.

Example 1.

Six parts of an aluminium alcoholate containing chlorine, obtained by melting with about 10% of aluminium chloride, are added as a powder to 135 parts of acetaldehyde, with efficient stirring and cooling. After a reaction of several hours 123 parts were distilled off giving an almost pure acetic ester fraction.

Example 2.

To 100 parts of cooled aldehyde contained in a vessel provided with stirring gear are added four parts of aluminium alcoholate product which was produced by treating aluminium alcoholate with water and melting in vacuo so that it contains 21% aluminium. The heat of reaction is removed by cooling and stirring continued for several hours. After the reaction is over, the product is distilled off and 87% of acetic ester is obtained.

The above mentioned catalysts can be applied both in the solid state and also in the dissolved form. In fact it has been found that the catalysts obtained by melting aluminium alcoholate with a substance containing a halogen are soluble in solvents such as ethyl acetate and indeed to a greater extent than pure aluminium alcoholate. These solutions are of advantage in so far as the catalysts and the aldehyde form one phase and are therefore in an ideal state of distribution, while in two phase systems there is a danger arising from ready over-heating, violent reaction and formation of by-products. Ethyl acetate is preferably used as solvent, when a subsequent separation of the solvent from the reaction product is unnecessary. This solution of the catalyst can either be added to the aldehyde or vice versa the aldehyde may be allowed to flow gradually into the solution. Finally it is possible to admix the solvent with the aldehyde ab initio and to introduce the solid catalyst into this mixture when complete or partial solution soon takes place.

We claim:

1. The process of making ethyl acetate which comprises bringing acetaldehyde in contact with aluminum alcoholate and a substance containing a halogen.

2. The process of making ethyl acetate which comprises treating aluminum alcoholate with a substance containing a halogen and causing the product resulting from such treatment to act upon acetaldehyde.

3. The process of making ethyl acetate which comprises treating aluminum alcoholate with aluminum chloride and causing the product resulting from such treatment to act upon acetaldehyde.

4. The process of making ethyl acetate which comprises melting aluminum alcoholate with aluminum chloride and causing the product resulting from such treatment to act upon acetaldehyde.

5. The process of making ethyl acetate which comprises treating aluminum alcoholate with a substance containing a halogen and causing the product resulting from such treatment to act upon acetaldehyde in the presence of a solvent capable of dissolving said product.

6. The process of making ethyl acetate which comprises treating aluminum alcoholate with aluminum chloride and causing the product resulting from such treatment to act upon acetaldehyde in the presence of a solvent capable of dissolving said product.

7. The process of making ethyl acetate which comprises treating aluminum alcoholate with a substance containing a halogen and causing the product resulting from such treatment to act upon acetaldehyde in the presence of ethyl acetate.

8. The process of making ethyl acetate which comprises treating aluminum alcoholate with aluminum chloride and causing the product resulting from such treatment to act upon acetaldehyde in the presence of ethyl acetate.

9. The process of making ethyl acetate which comprises bringing acetaldehyde in contact with aluminum alcoholate and a substance containing a halogen in the presence of a solvent.

10. The process of making ethyl acetate which comprises treating aluminum alcoholate with a substance containing a halogen, dissolving the product resulting from such treatment in an indifferent organic solvent and causing the solution thus obtained to act upon acetaldehyde.

11. The process of making ethyl acetate which comprises treating aluminum alcoholate with aluminum chloride dissolving the product resulting from such treatment in an indifferent organic solvent and causing the solution thus obtained to act upon acetaldehyde.

12. The process of making ethyl acetate which comprises treating aluminum alcoholate with a substance containing a halogen, dissolving the product resulting from such treatment in ethyl acetate and causing the solution thus obtained to act upon acetaldehyde.

13. The process of making ethyl acetate which comprises treating aluminum alcoholate with aluminum chloride, dissolving the product resulting from such treatment in ethyl acetate and causing the solution thus obtained to act upon acetaldehyde.

In testimony whereof we affix our signatures in presence of two witnesses.

Dr. MARTIN MUGDAN.
Dr. WILLY HERRMANN.

Witnesses:
MARTIN ERHARD,
ERICH BAUM.